(12) United States Patent
Okubo (10) Patent No.: US 11,892,899 B2
(45) Date of Patent: Feb. 6, 2024

(54) INFORMATION PROCESSING APPARATUS

(71) Applicants: DENSO CORPORATION, Kariya (JP); NSITEXE, Inc., Tokyo (JP)

(72) Inventor: Naoaki Okubo, Kariya (JP)

(73) Assignees: DENSO CORPORATION, Kariya (JP); NSITEXE, INC., Tokyo (JP)

( * ) Notice: Subject to any disclaimer, the term of this patent is extended or adjusted under 35 U.S.C. 154(b) by 700 days.

(21) Appl. No.: 17/034,513

(22) Filed: Sep. 28, 2020

(65) Prior Publication Data
US 2021/0011827 A1  Jan. 14, 2021

Related U.S. Application Data

(63) Continuation of application No. PCT/JP2019/009629, filed on Mar. 11, 2019.

(30) Foreign Application Priority Data

Mar. 30, 2018 (JP) ................. 2018-068431

(51) Int. Cl.
*G06F 11/00* (2006.01)
*G06F 11/07* (2006.01)
*G06F 9/30* (2018.01)
*G06F 9/48* (2006.01)
*G06F 9/50* (2006.01)
(Continued)

(52) U.S. Cl.
CPC ........ *G06F 11/0721* (2013.01); *G06F 9/3009* (2013.01); *G06F 9/4881* (2013.01); *G06F 9/5027* (2013.01); *G06F 11/0757* (2013.01); *G06F 11/3024* (2013.01); *G06F 11/327* (2013.01); *G06F 11/328* (2013.01)

(58) Field of Classification Search
CPC .............. G06F 11/327; G06F 11/0757; G06F 11/3024; G06F 11/328; G06F 11/0721; G06F 9/3009; G06F 9/4881; G06F 9/5027
See application file for complete search history.

(56) References Cited

U.S. PATENT DOCUMENTS 6,615,366 B1   9/2003  Grochowski et al.
7,509,533 B1 *  3/2009  Govindarajalu .... G06F 11/2242
                                                                  714/37
(Continued)

FOREIGN PATENT DOCUMENTS

JP       2002229792 A    8/2002

OTHER PUBLICATIONS

Sebastian Weis: "Fault-Tolerant Coarse-Grained Data-Flow Execution", PhD Thesis of University of Augsburg, Nov. 26, 2015, pp. 1-135, XP055515407, Retrieved from the Internet: URL:https://opus.bibliothek.uni-augsburg.de/opus4/frontdoor/deliver/index/docid/3855/file/Dissertation Weis 2016.pdf [retrieved on Oct. 15, 2018].

*Primary Examiner* — Joseph D Manoskey
(74) *Attorney, Agent, or Firm* — POSZ LAW GROUP, PLC (57) ABSTRACT

An information processing apparatus includes a thread scheduler that allocates a process to multiple process execution hardware that process a program having a graph structure. The information processing apparatus includes: a code reader that reads a diagnostic code stored in advance; and an allocator that causes the multiple process execution hardware to execute the diagnostic code so as to complete diagnosis within a mean time to failure.

5 Claims, 8 Drawing Sheets

(51) Int. Cl.
  *G06F 11/30*   (2006.01)
  *G06F 11/32*   (2006.01)

(56) References Cited

U.S. PATENT DOCUMENTS

| | | | | |
|---|---|---|---|---|
| 8,966,453 | B1* | 2/2015 | Zamfir | G06F 11/3604 |
| | | | | 717/124 |
| 2002/0091997 | A1* | 7/2002 | Alford | G06F 11/366 |
| | | | | 717/127 |
| 2006/0069953 | A1* | 3/2006 | Lippett | G06F 11/3636 |
| | | | | 714/25 |
| 2007/0266387 | A1 | 11/2007 | Henmi | |
| 2008/0005207 | A1 | 1/2008 | Kumazawa et al. | |
| 2008/0098207 | A1* | 4/2008 | Reid | G06F 11/362 |
| | | | | 714/E11.207 |
| 2010/0169582 | A1 | 7/2010 | Hinton et al. | |
| 2012/0210164 | A1 | 8/2012 | Gara et al. | |
| 2015/0234760 | A1 | 8/2015 | Kimura | |
| 2015/0293173 | A1 | 10/2015 | Tsuboi et al. | |
| 2016/0321078 | A1 | 11/2016 | Bailey | |
| 2018/0067882 | A1 | 3/2018 | Kimura | |
| 2018/0080984 | A1 | 3/2018 | Tsuboi et al. | |

\* cited by examiner

INFORMATION PROCESSING APPARATUS

CROSS REFERENCE TO RELATED APPLICATIONS

The present application is a continuation application of International Patent Application No. PCT/JP2019/009629 filed on Mar. 11, 2019, which designated the U.S. and claims the benefit of priority from Japanese Patent Application No. 2018-068431 filed on Mar. 30, 2018. The entire disclosures of all of the above applications are incorporated herein by reference.

TECHNICAL FIELD

The present disclosure relates to an information processing apparatus including a thread scheduler that allocates a process to multiple process execution hardware that process a program having a graph structure.

BACKGROUND

A system for ensuring a functional safety of processing elements that are multiple process execution hardware has been proposed. The system is built by a safety concept that issuing the same processes to the process execution hardware for observing the output difference between them (known as software lockstep). In the system, a bus interface unit is employed. The bus interface unit monitors requests issued by the process execution hardware. If there is a mismatch between them, the unit processes a procedure for handling the error causing the mismatch. Otherwise, the unit does regular operations.

SUMMARY

An information processing apparatus may include a thread scheduler that may allocate a process to multiple process execution hardware that may process a program having a graph structure. The information processing apparatus may include: a code reader that may read a diagnostic code stored in advance; and an allocator that may cause the multiple process execution hardware to execute the diagnostic code so as to complete diagnosis within a mean time to failure.

DETAILED DESCRIPTION

A requirement of a functional safety is a confirmation of whether there is a hardware failure. In the confirmation, a different hardware resource performs a duplicate execution on a process, and results are compared. In the duplicate execution, changing an execution timing and an execution hardware resource is a requirement for a failure detection. Conventionally, the same software is executed by multiple process execution hardware having the same configuration.

However, since a premise of the conventional failure detection is that the process execution hardware is duplicated, there is a limit to a compact configuration of a process execution hardware.

One example of the present disclosure implements a failure detection of a process execution hardware without duplication of hardware.

According to one example embodiment, an information processing apparatus includes a thread scheduler that allocates a process to multiple process execution hardware that process a program having a graph structure. The information processing apparatus includes a code reader that reads a diagnostic code stored in advance and an allocator that causes the multiple process execution hardware to execute the diagnostic code so as to complete diagnosis within a mean time to failure.

Since the multiple process execution hardware are caused to execute the diagnostic code so as to complete the diagnosis within the mean time to failure, it may be possible to perform failure diagnosis using the process execution hardware already placed for processing without duplicating hardware for the failure diagnosis.

Hereinafter, the present embodiment will be described with reference to the attached drawings. In order to facilitate the ease of understanding, the same reference numerals are attached to the same configuration elements in each drawing where possible, and redundant explanations are omitted.

Figure 1:
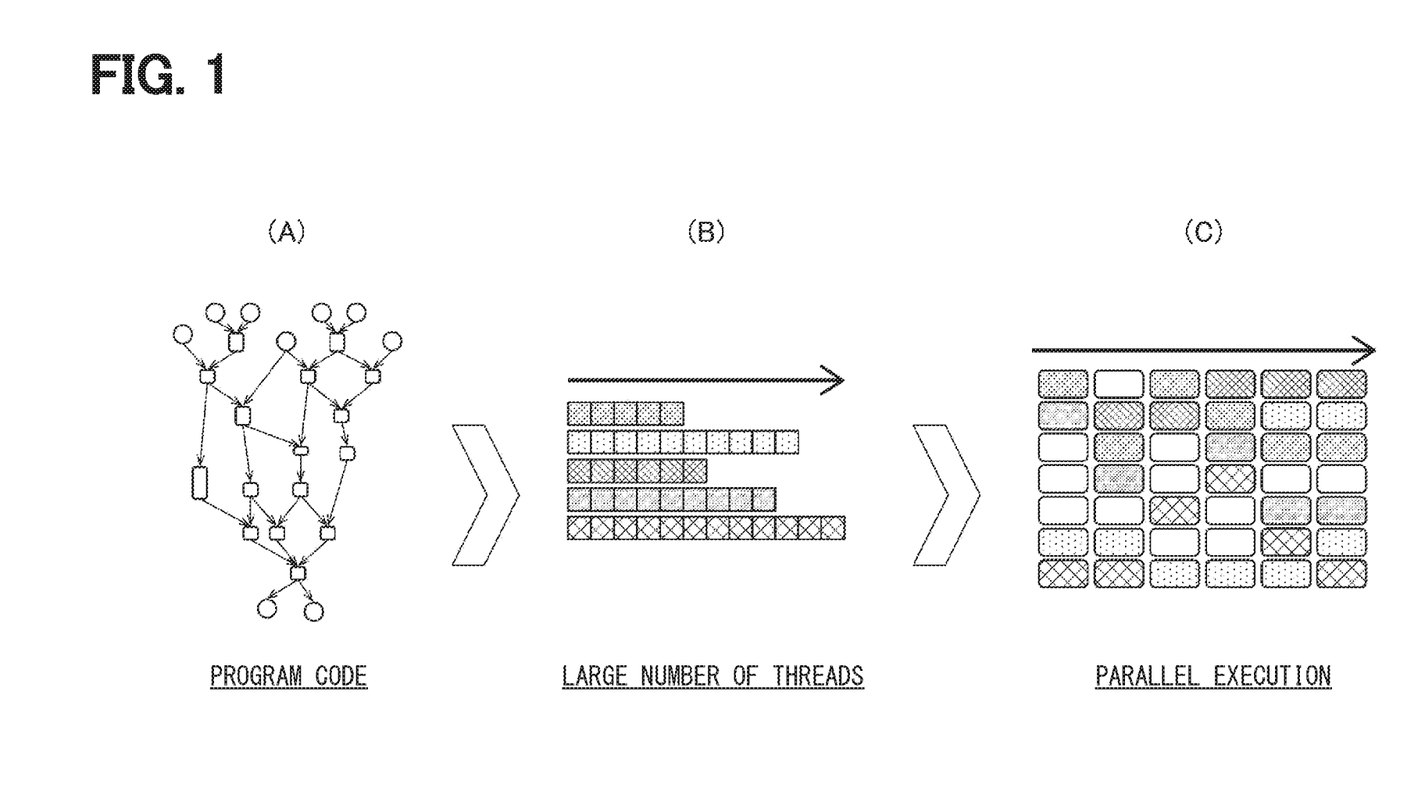
FIG. 1 is a diagram illustrating parallel processing that is a premise of the present embodiment.

FIG. 1(A) shows a program code having a graph structure. FIG. 1(B) shows a thread state. FIG. 1(C) is a situation of parallel processing.

As shown in FIG. 1(A), in the present embodiment, a program to be processed has a graph structure in which data and the process are divided. This graph is structured by considering a task and graph parallelism of the program.

When a compiler performs automatic vectorization and extraction of the graph structure on the program code shown in FIG. 1(A), a large number of threads as shown in FIG. 1(B) can be generated.

Hardware performs a dynamic register assignment and a thread scheduling on the large number of threads shown in FIG. 1(B), and thereby a parallel execution as shown in FIG. 1(C) can be performed. By performing the dynamic assignment of a register resource during execution, it may be possible to perform the parallel execution on multiple threads for different instruction streams.

Figure 2:
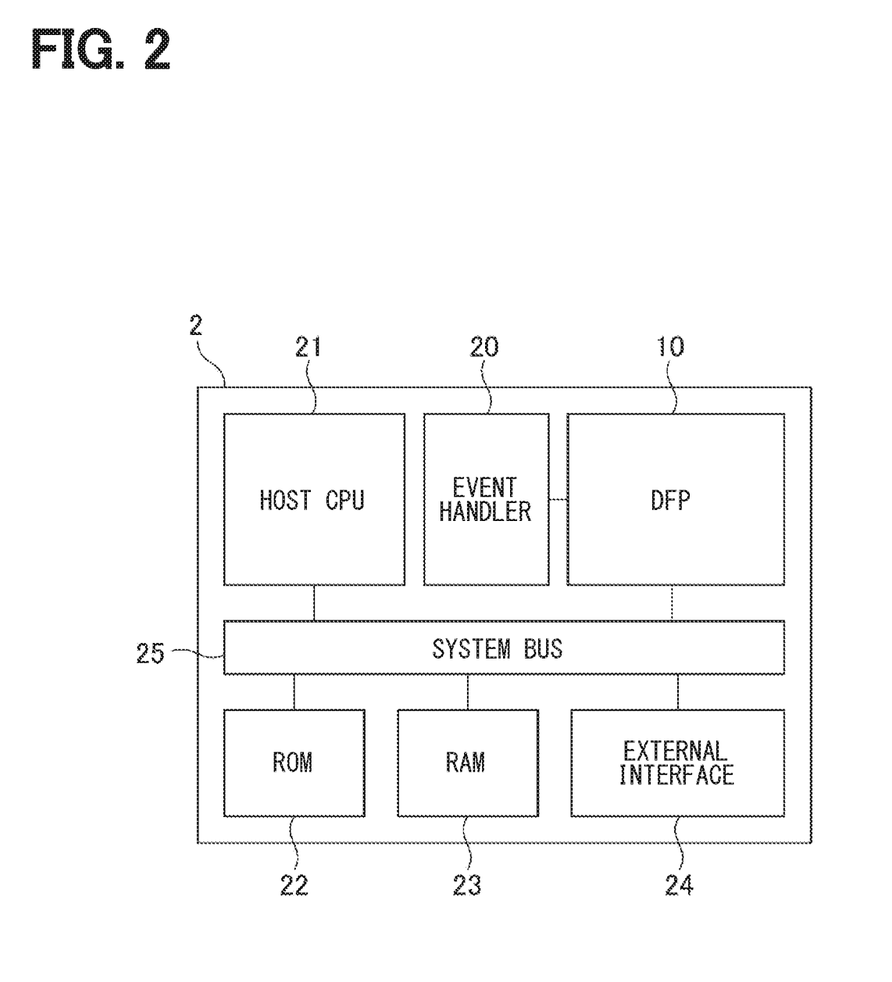
FIG. 2 is a diagram showing a system configuration example for executing the parallel processing shown in FIG. 1.

Next, with reference to FIG. 2, a data process system 2 will be described. The data process system 2 is a system configuration example that includes a DFP (Data Flow Processor) 10 as an accelerator performing the dynamic register assignment and the thread scheduling.

The data process system 2 includes the DFP 10, an event handler 20, a host CPU 21, a ROM 22, a RAM 23, an external interface 24, and a system bus 25. The host CPU 21 is an arithmetic operation device that mainly processes data. The host CPU 21 supports an OS. The event handler 20 generates an interrupt process.

The ROM 22 is a memory only for reading. The RAM 23 is a memory for reading and writing. The external interface 24 is an interface for exchanging information with the outside of the data process system 2. The system bus 25 is for sending and receiving the information among the DFP 10, the host CPU 21, the ROM 22, the RAM 23, and the external interface 24.

The DFP 10 is positioned as an individual master placed for handling a heavy arithmetic operation load of the host CPU 21. The DFP 10 supports the interrupt generated by the event handler 20.

Figure 3:
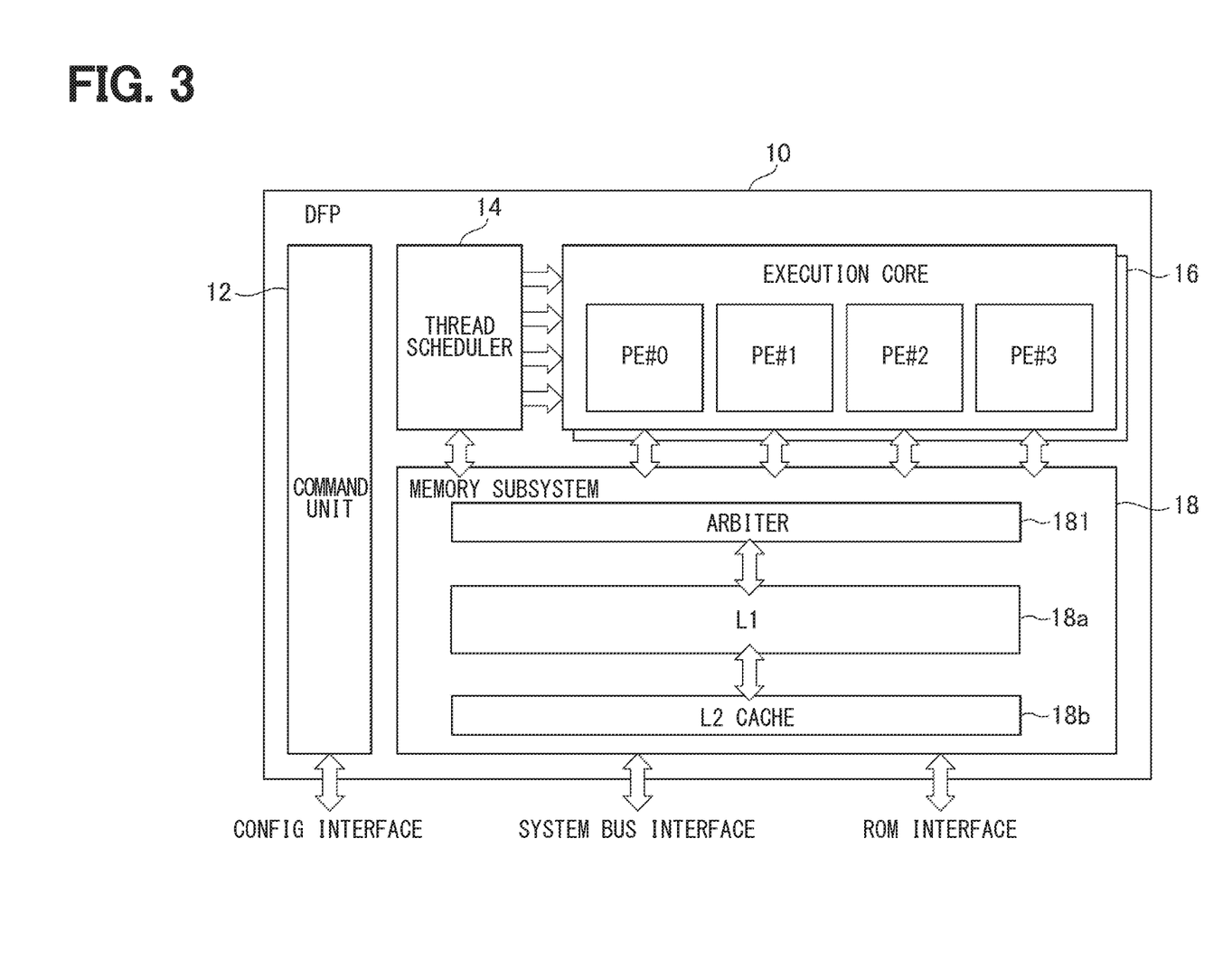
FIG. 3 is a diagram showing a configuration example of a DFP used in FIG. 2.

Next, with reference to FIG. 3, the DFP 10 will be described. As shown in FIG. 3, the DFP 10 includes a command unit 12, a thread scheduler 14, an execution core 16, and a memory subsystem 18.

The command unit 12 can communicate the information with a config interface. The command unit 12 also functions as a command buffer.

The thread scheduler 14 schedules the processing of the large number of threads as exemplified in FIG. 1(B). The thread scheduler 14 can perform the scheduling across the threads.

The execution core 16 has four processing elements of a PE #0, a PE #1, a PE #2, and a PE #3. The execution core 16 has a large number of pipelines that can be independently scheduled.

The memory subsystem 18 has an arbiter 181, a L1 cache 18a, and a L2 cache 18b. The memory subsystem 18 can communicate the information with a system bus interface and a ROM interface.

Figure 4:
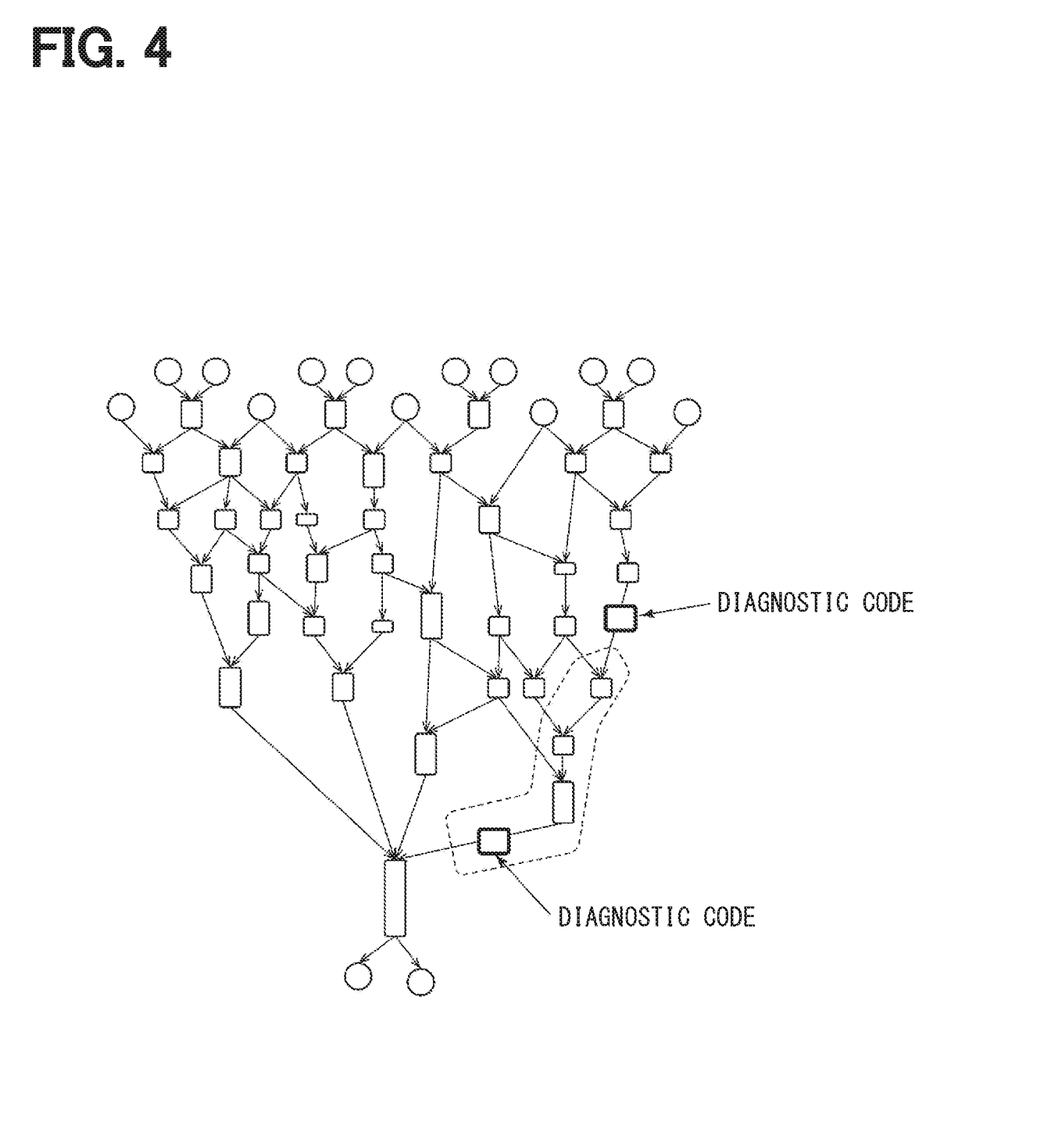
FIG. 4 is a diagram illustrating one aspect that executes a diagnostic code in the present embodiment.

Next, with reference to FIGS. 4 and 5, the execution of the diagnostic code in the present embodiment will be described. An example shown in FIG. 4 is an example in which the diagnostic code is embedded, in advance, in the program having the graph structure. By executing the program in which the diagnostic code is embedded as described above, it may be possible to execute the diagnostic code at a timing intended in advance.

Figure 5:
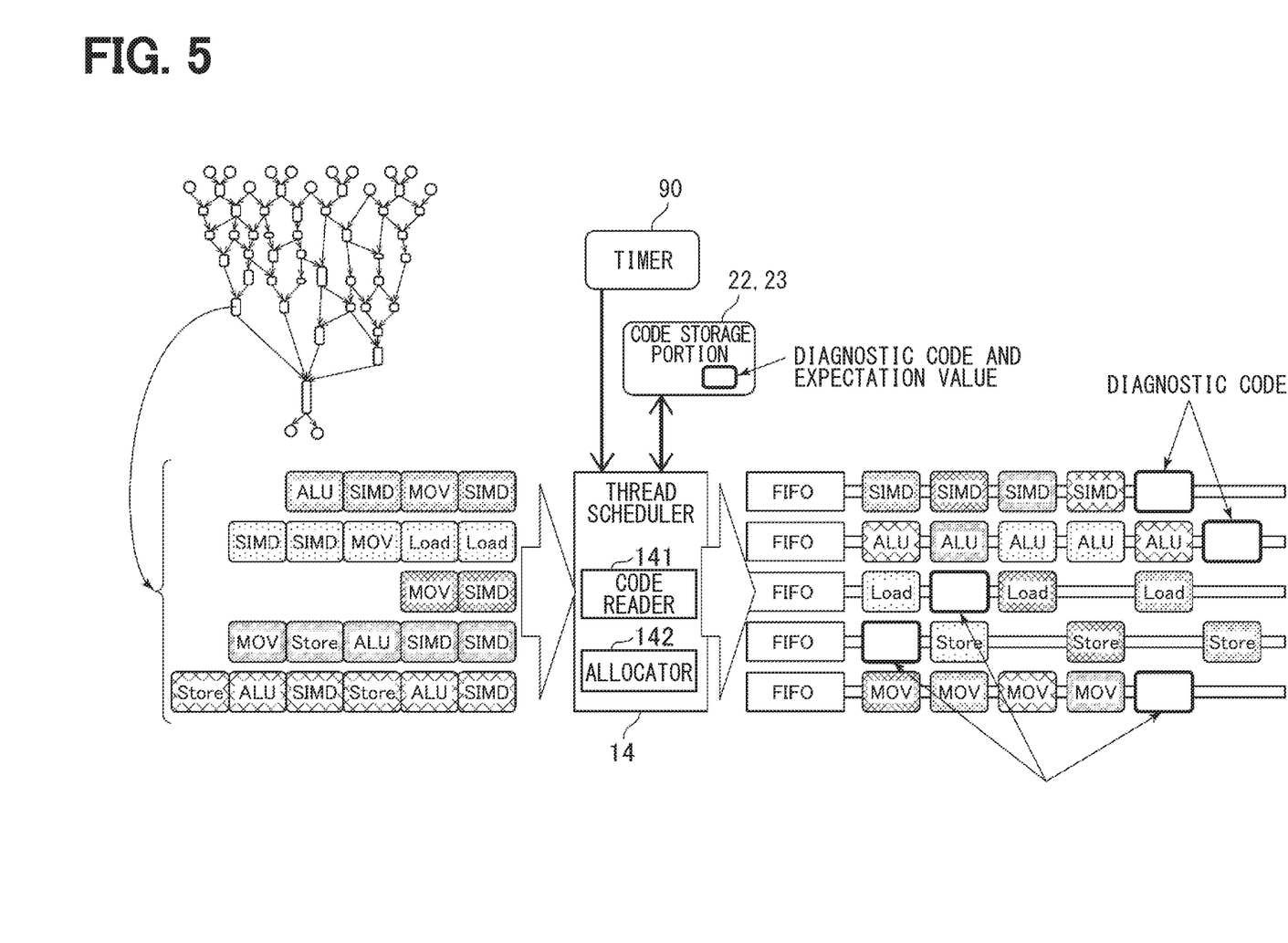
FIG. 5 is a diagram illustrating one aspect that executes the diagnostic code in the present embodiment.

An example shown in FIG. 5 is an example in which the thread scheduler 14 includes a code reader 141 and an allocator 142 and thereby the diagnostic code is executed. A timer 90 outputs time point information to the thread scheduler 14. The thread scheduler 14 can read the diagnostic code and an expectation value that are stored in a code storage portion. The code storage portion corresponds to the ROM 22 and the RAM 23.

As a functional configuration element other than the normal thread scheduling function, the thread scheduler 14 includes the code reader 141 and the allocator 142.

The code reader 141 reads the diagnostic code stored in advance. The diagnostic code is stored in the code storage portion. Since the code storage portion also stores the expectation value of a result obtained by executing the diagnostic code, the code reader 141 can also read the expectation value.

The allocator 142 causes the multiple process execution hardware to execute the diagnostic code so that the diagnosis is completed within a mean time to failure (MTTF). The allocator 142 allocates the execution of the diagnostic code so that the diagnosis is completed within the MTTF by using time point information output from the timer 90.

The diagnostic code allocation by the allocator 142 may be performed for each execution core, as shown in FIG. 3. The diagnostic code allocation by the allocator 142 may be performed for each arithmetic operation instrument of the execution core.

Figure 6:
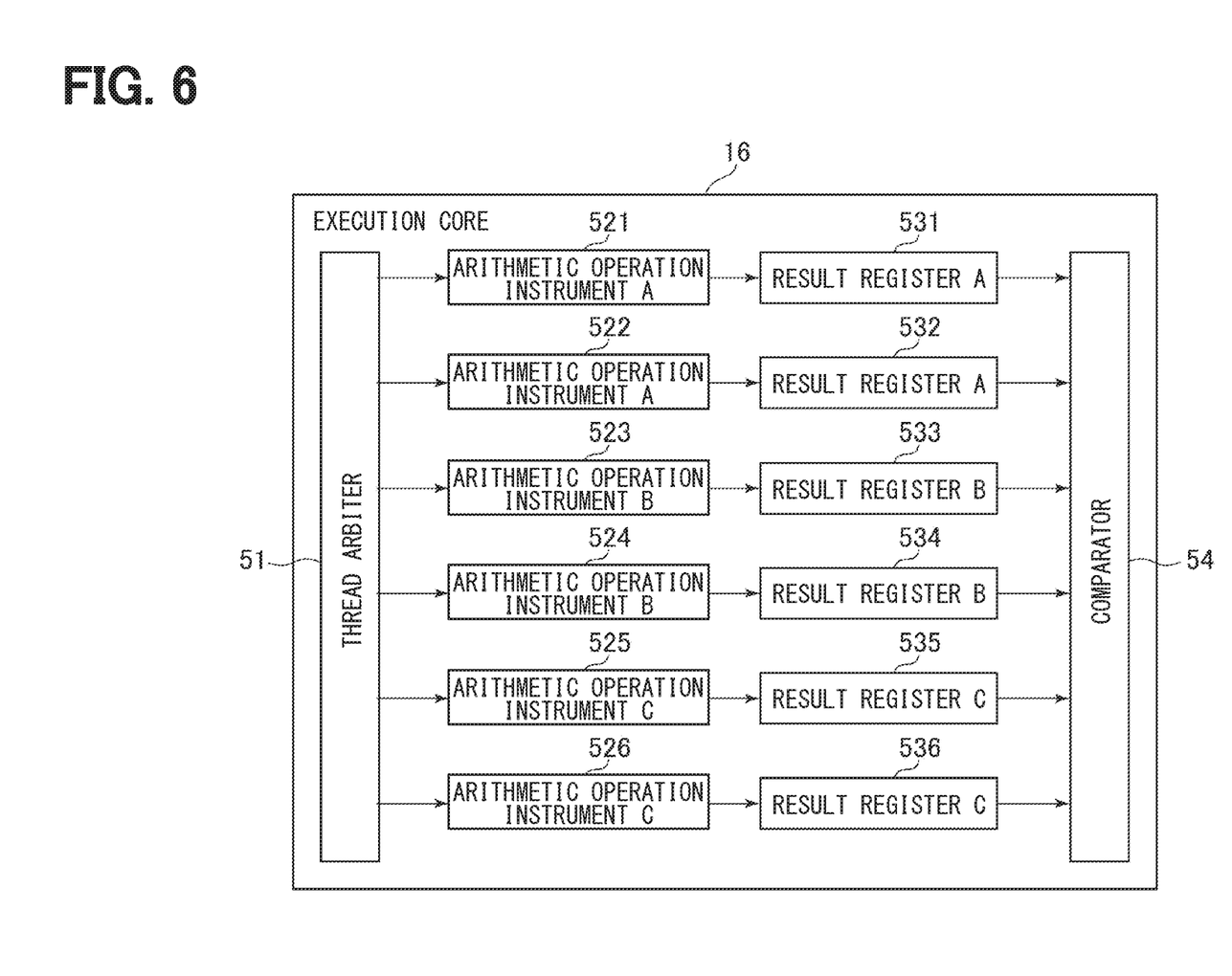
FIG. 6 is a diagram illustrating one aspect that executes the diagnostic code in the present embodiment.

As shown in FIG. 6, the execution core 16 includes multiple arithmetic operation instruments. Specifically, the execution core 16 includes a thread arbiter 51, an arithmetic operation instrument A521, an arithmetic operation instrument A522, an arithmetic operation instrument B523, an arithmetic operation instrument B524, an arithmetic operation instrument C525, an arithmetic operation instrument C526, a result register A531, a result register A532, a result register B533, a result register B534, an expectation value register C535, an expectation value result D536, and a comparator 54.

The thread arbiter 51 allocates the process to the arithmetic operation instrument A521, the arithmetic operation instrument A522, the arithmetic operation instrument B523, the arithmetic operation instrument B524, the arithmetic operation instrument C525, and the arithmetic operation instrument C526. In accordance with the diagnostic code allocation by the allocator 142, the thread arbiter 51 allocates the diagnostic code execution to the arithmetic operation instrument A521, the arithmetic operation instrument A522, the arithmetic operation instrument B523, the arithmetic operation instrument B524, the arithmetic operation instrument C525, and the arithmetic operation instrument C526.

The arithmetic operation instrument A521, the arithmetic operation instrument A522, the arithmetic operation instrument B523, the arithmetic operation instrument B524, the arithmetic operation instrument C525, and the arithmetic operation instrument C526 execute the allocated processes. The arithmetic operation instrument A521 and the arithmetic operation instrument A522 have the same configuration and the same function. The arithmetic operation instrument B523 and the arithmetic operation instrument B524 have the same configuration and the same function. The arithmetic operation instrument C525 and the arithmetic operation instrument C526 have the same configuration and the same function.

The result register A531 stores the arithmetic operation result of the arithmetic operation instrument A521. The result register A532 stores the arithmetic operation result of the arithmetic operation instrument A522. The result register B533 stores the arithmetic operation result of the arithmetic operation instrument B523. The result register B534 stores the arithmetic operation result of the arithmetic operation instrument B524.

The expectation value register C535 stores the expectation value output from the arithmetic operation instrument C525. The arithmetic operation instrument C525 executes the expectation value process allocated by the thread arbiter 51, and stores the expectation value in the expectation value register C535. An expectation value register C536 stores the expectation value output from the arithmetic operation instrument C526. The arithmetic operation instrument C526 executes the expectation value process allocated by the thread arbiter 51, and stores the expectation value in the expectation value register C536.

The comparator 54 compares, for example, a value stored in the result register A531 with a value stored in the result register A532. In a case where the results are the execution results of the diagnostic code, when the values are matched, the comparator 54 determines that comparison result is normal. The comparator 54 compares, for example, the value stored in the result register A531 with a value stored in the expectation value register C536. In a case where the results are the execution results of the diagnostic code, when the values are matched, the comparator 54 may determine that comparison result is normal.

Figure 7:
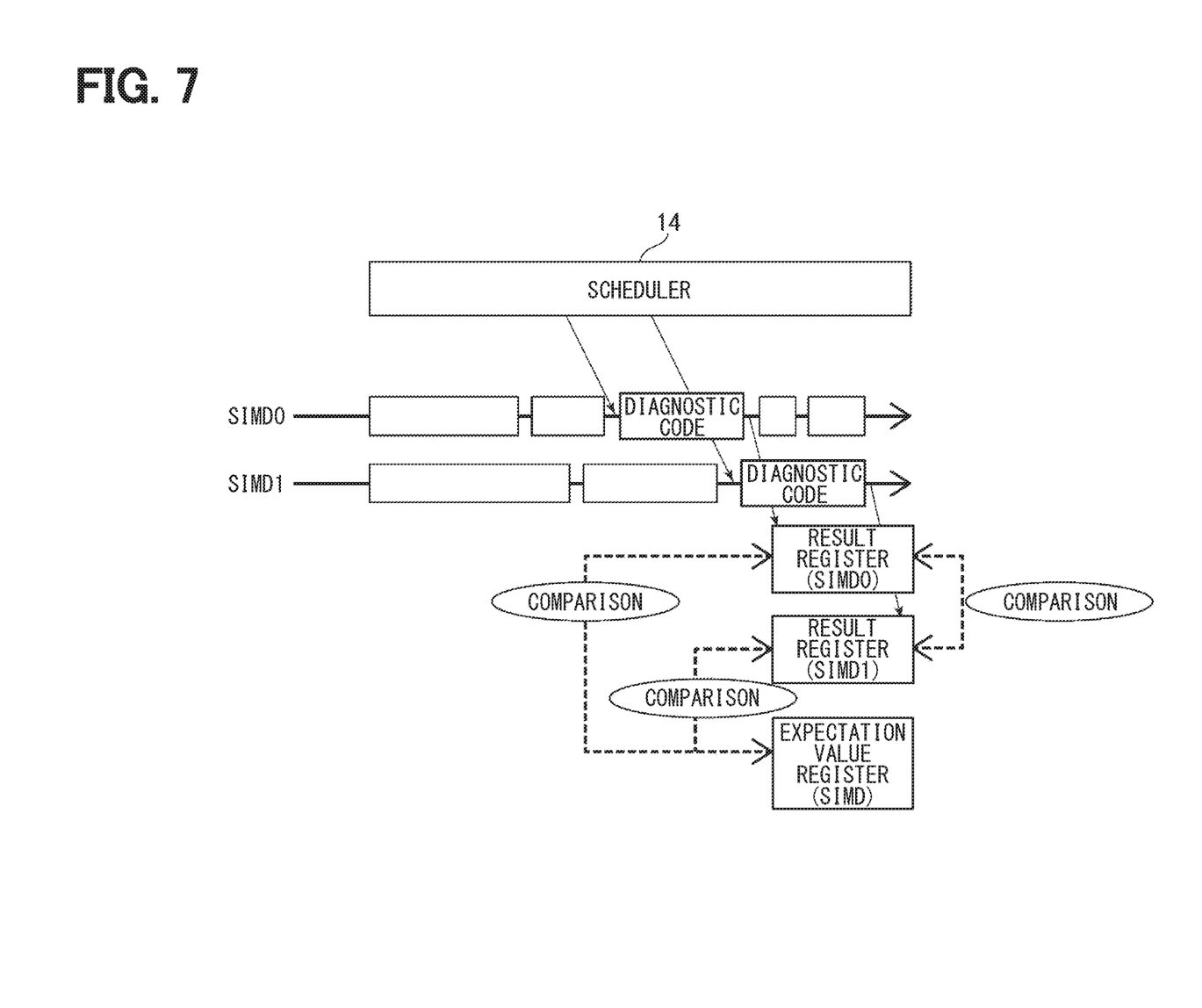
FIG. 7 is a diagram illustrating one aspect that executes the diagnostic code in the present embodiment.
Figure 8:
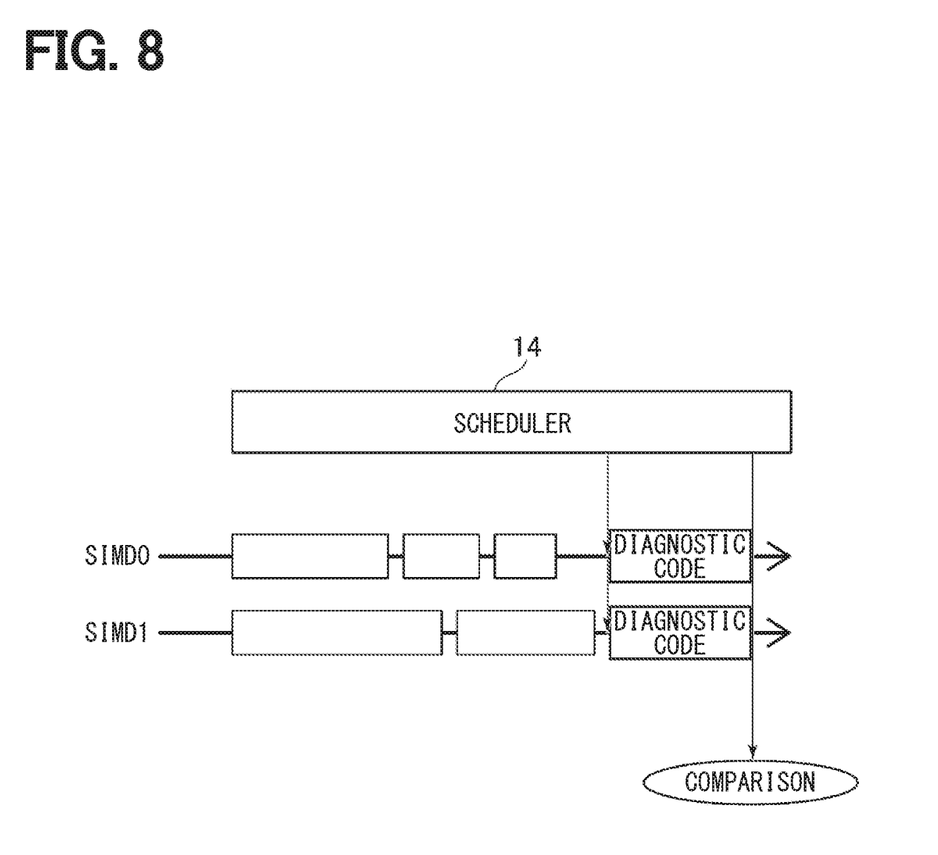
FIG. 8 is a diagram illustrating one aspect that executes the diagnostic code in the present embodiment.

As shown in FIG. 7, the diagnostic code execution may be performed by the same type of arithmetic operation instrument at a different timing. As shown in FIG. 8, the diagnostic code execution may be performed by the same type of arithmetic operation instrument at the same timing.

According to the present embodiment described, the DFP 10 may correspond to an information processing apparatus of the present disclosure. The information processing apparatus includes a thread scheduler that allocates the process to multiple process execution hardware that process the program having the graph structure. The information processing apparatus includes the code reader 141 that reads the diagnostic code stored in advance and the allocator 142 that causes the multiple hardware to execute the diagnostic code so that the diagnosis is completed within the mean time to failure.

Since the allocator 142 causes the multiple process execution hardware to execute the diagnostic code so that the diagnosis is completed within the mean time to failure, it may be possible to perform the failure diagnosis using the process execution hardware already provided for the processing without duplicating the hardware for the failure diagnosis.

In the present embodiment, the coder reader 141 can also read the expectation value of the result obtained by executing the diagnostic code stored in advance.

In the present embodiment, the process execution hardware is the arithmetic operation instrument of the execution core.

In the present embodiment, the allocator 142 performs the allocation so that the diagnostic code is executed in each of the multiple process execution hardware at the different timings.

In the present embodiment, when the execution result of the diagnostic code shows the failure, the allocator 142 causes another process execution hardware having the same type to execute the diagnostic code again.

The embodiments have been described with reference to above specific examples. However, the present disclosure is not limited to these specific examples. Those skilled in the art appropriately modifies design to these specific examples, which are also included in the scope of the present disclosure as long as they have the features of the present disclosure. The elements, the arrangement, the conditions, the shape, etc. of the specific examples described above are not limited to those examples and can be appropriately modified. The combinations of elements included in each of the above described specific examples can be appropriately modified as long as no technical inconsistency occurs.

The invention claimed is:

1. An information processing apparatus comprising
a processor configured to:
   allocate a process to a plurality of process execution hardware configured to process a program having a graph structure;
   read a diagnostic code stored in advance; and
   cause the plurality of process execution hardware to execute the diagnostic code,
wherein
the graph structure has a task parallelism of a program and a graph parallelism of the program.

2. The information processing apparatus according to claim 1, wherein:
the processor is configured to read an expectation value of a result obtained by executing the diagnostic code stored in advance.

3. The information processing apparatus according to claim 1, wherein:
an execution core includes the plurality of process execution hardware that are a plurality of arithmetic operation instruments.

4. The information processing apparatus according to claim 1, wherein:
the processor is configured to allocate the diagnostic code to the plurality of process execution hardware so that each of the plurality of process execution hardware executes the diagnostic code at a different timing from each other.

5. The information processing apparatus according to claim 1, wherein:
the processor is configured to cause another process execution hardware having an identical type to execute the diagnostic code again when an execution result of the diagnostic code shows a failure.

\* \* \* \* \*